Oct. 29, 1968  H. A. LENNING  3,407,528
ICE FISHING REEL AND SUSPENSION MEANS THEREFOR
Filed Dec. 22, 1965
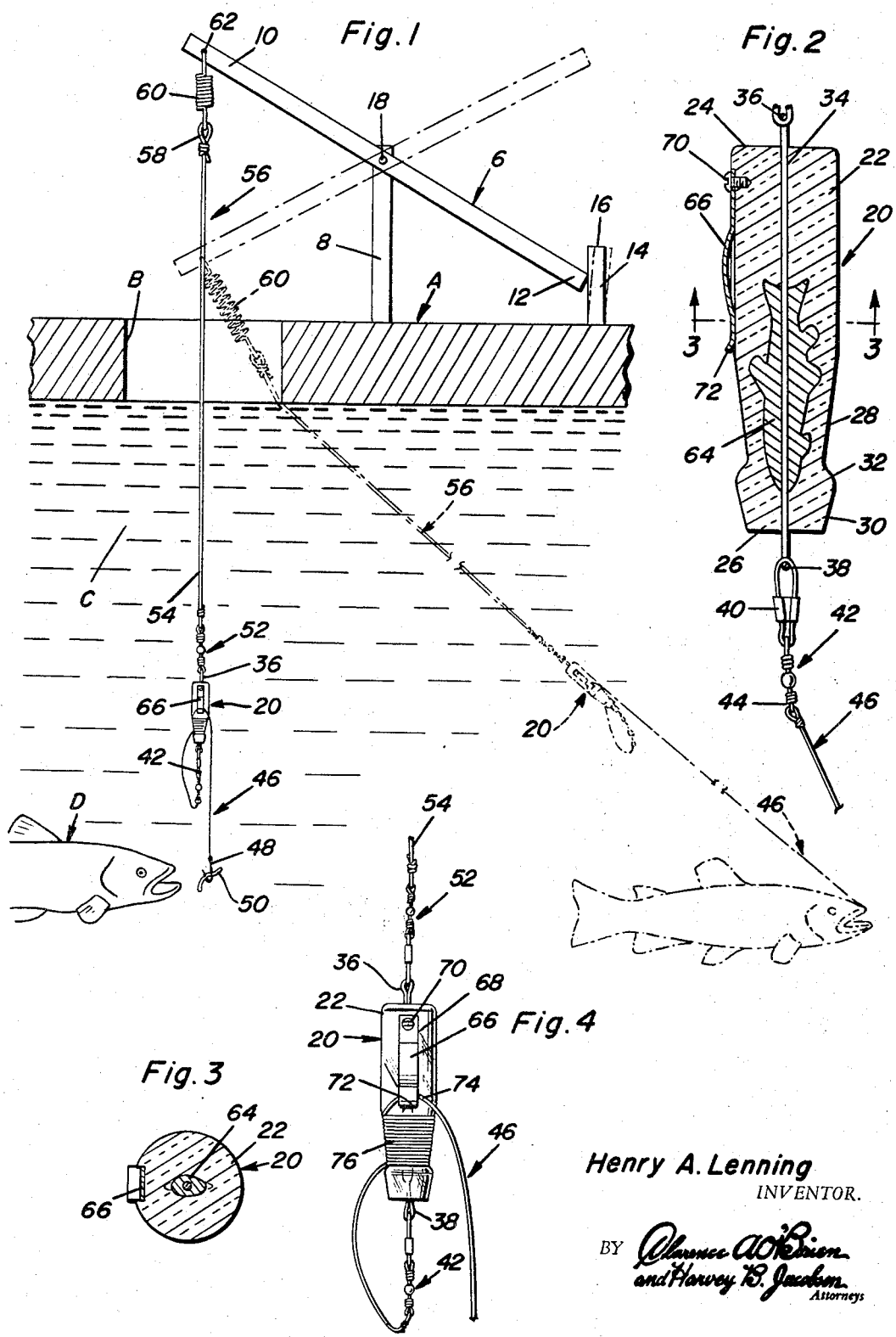
Henry A. Lenning
INVENTOR.
BY Clarence A. O'Brien
and Harvey B. Jacobson
Attorneys

United States Patent Office 3,407,528
Patented Oct. 29, 1968

3,407,528
ICE FISHING REEL AND SUSPENSION
MEANS THEREFOR
Henry A. Lenning, P.O. Box 247,
Columbus, Mont. 59019
Filed Dec. 22, 1965, Ser. No. 515,591
2 Claims. (Cl. 43—17)

ABSTRACT OF THE DISCLOSURE

The upper end of a line is connected to a coil spring on the pull responsive tip-down end of the pivoted beam of a signalling tip-up. The lower end of the line is joined to a swivel on the upper end of a rod extending axially through a unique transparent body constituting (1) a lure and (2) a reel. A lower end of the body is reduced to define a smooth-surfaced neck terminating in a head. An upper end of a leader is coiled around the neck and is releasably held by a spring clip providing a retaining latch. When the leader is yanked by a caught fish the leader pays out and the above-named line descends, actuates the tip-up and alerts the fisherman.

This invention relates to ice fishing equipment and, more particularly, to an apparatus characterized by a conventional-type bite signalling tip-up and the combination therewith of a unique reel, and means whereby the reel is novelly oriented with and cooperatively joined to the pivoted beam of the tip-up.

The tip-up comprises a stationary standard atop which the median portion of the tiltable beam is pivoted so that the tip-down end is directly over the customary ice hole. While the tip-up is a contributory unit of the overall combination and may vary in form and adaptability, the essence of the concept has to do with a structurally and functionally novel reel, leader, and line which suspends and connects the reel to the tilting beam of the tip-up.

The capability and performance of the invention relies significantly on the reel in that it is constructed in such a way that it can rotate and freely spin the hand-wound leader therefrom when the fish takes the hook. To the ends desired, an elongated cylindrical body is equipped at upper and lower ends, respectively, with swivels, one for a suspension or fishing line and the other one for the attachable end of the leader. By preference the body is made of clear transparent plastic material, has a rod extending axially therethrough, and is provided with terminal eyes to which the swivels are suitably connected.

The suspended lower end of the body is reduced in cross-section and defines and provides a smooth-surfaced neck and an enlarged terminal head. These features define the reel proper, that is, the component on which the inner end portion of the leader is coiled and wound. A simple spring metal clip is mounted on the body and is operatively cooperable with the neck and leader and serves as a pull-actuated retaining and releasing latch or catch for the leader. When the leader is pulled by the fish, it is released and pays out and when tension is applied to the suspension line the bite signalling tip-up comes into play and alerts the fisherman. Such steps as are then necessary and customary are followed to land the hooked fish.

Another improvement resides in embedding a viewable artificial bait in the body of the transparent reel whereby the latter functions not only as a reel but also as an efficient lure.

Novelty is also predicated on using a stout cord or an equivalent flexible element as the fishing and reel suspension line. For large fish, a coil spring of suitable strength is used to connect the upper end of the line to the tip-up beam. With or without the spring the line is such in construction that it resists freezing and, since it remains flexible and pliant, it well serves its intended dual purpose function as the fishing line as well as the reel suspension means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation showing the overall ready-to-use structure including the improved reel, suspension means therefor, the latter including a tip-up, the operating position of said tip-up being shown in phantom lines;

FIGURE 2 is a view of the improved reel on an enlarged scale with parts appearing in section and elevation;

FIGURE 3 is a cross-section on the line 3—3 of FIGURE 2; and

FIGURE 4 is a view of the reel showing with particularity how the leader is wound and clipped in readiness for use.

Referring first to FIGURE 1 the ice is denoted at A, the ice fishing hole at B, the water at C and the potential catch, the fish, at D.

The tip-up is denoted generally by the numeral 6. It is substantially conventional in form and embodies a suitably anchored vertical post or upright 8 supporting a beam or arm. The tip-down end portion of the beam is denoted at 10 and the signalling tip-up end is denoted at 12. The numeral 14 designates an optionally usable flexible and resilient holddown stake whose upper end portion 16 can be flexed as shown in phantom lines. The median or central portion of the beam is pivotally mounted atop the standard as at 18. In actual practice the holddown stake 14 may be of any suitable construction and amply sensitive to release the beam or, if preferred, an adjustable weight (not shown) may be substituted for the stake. The overall tip-up may be of any appropriate construction.

With reference now to the reel 20 it is to be pointed out that experience has shown that it is preferably of the construction herein shown and described. It comprises an elongated body of requisite weight which in use depends into the water being fished in the manner shown in FIG. 1. This body functions not only as a reel but also as a lure. It follows that at least the lower half-portion of the body is preferably circular in cross-section. Also as a general rule the major upper body portion 22 is circular in cross-section. The upper end is flat as at 24. The lower end 26 is also flat. That portion just above the lower end is gradually reduced downwardly in cross-section and defines a smooth-surfaced neck 28 merging into the head 30. There is a rounded shoulder 32 at the juncture of the head and neck. An elongated linearly straight rod 34 is embedded lengthwise in the axial portion of the overall body and has an upper end fashioned into an eye 36 and a lower end likewise fashioned into an eye 38. A snap fastener 40 is connected to the eye 38 and carries a swivel 42 to which the inner end portion 44 of the leader 46 is connected. The leader is of appropriate nylon or other equivalent material and of requisite gauge and length. The free or outer end thereof is provided with a fishhook 48 carrying a bait 50. A second swivel 52 (FIGS. 1 and 4) is joined to the eye 36 and the swivel serves to accommodate the lower end portion 54 of the suspension means. This means more specifically comprises a stout cord 56 which is of requisite length and flexibility. The gauge of the cord should be reliably strong. However, the cord should be amply pliant and flexible. The upper end 58 is connected with a coil spring 60 (an optional feature) which in turn is connected at 62 to the tip-down end of the beam in the manner shown. Where one anticipates catching large fish the coil spring 60 extends (in the manner shown in phantom lines in FIG. 1) to guard against breakage of the cord 56.

Returning to the lure-type reel 20 and with reference to FIGS. 2 and 3, it will be seen that an artificial bait 64 is provided and is embedded in the clear plastic body and this bait plus the elongated shape of the reel itself has been found to constitute and provide a highly satisfactory lure. A spring catch or clip 66 is provided and is exteriorly arranged and has its upper end 68 fastened at 70 to the upper end portion of the body. The lower free and flexible end is flared outwardly as at 72 and is located proximal to the reduced neck where it serves to releasably clip and retain the portion 74 of the leader, that is, when the adjacent portion is hand-wrapped and nicely coiled as at 76 around the neck upwardly of the head 30.

The manner in which the leader is set for use is evident in FIG. 4. The structural features of the overall lure type reel 20 will be clear from FIG. 2. The manner in which the overall apparatus is rigged for use is shown in FIG. 1. FIG. 1 also shows the full and phantom line positions of the coacting parts thus making the mode of use substantially self-evident. It may be added, however, that when the fish takes the bait in the manner suggested at the left in FIG. 1, and exerts a pull on the coiled or wound leader, the coils peel or whorl off of the neck and the leader is extended to the dotted line position shown. In the latter position, the tip-up comes into play and alerts the fisherman whereby such steps as are necessary may be taken to land the catch.

What is claimed as new is as follows:

1. An ice fishing device comprising, in combination, a body of elongate solid cylindrical form and made of clear transparent plastic material and having an artificial bait embedded therein and providing a lure, said body being vertically elongated and having a lower end portion circular and reduced in cross-sectional dimension and providing a smooth-surfaced neck and a terminal head, a rod passing axially lengthwise through said body and having an upper end projecting beyond the upper end of the body and terminating in a first eye, having a lower end projecting beyond an adjacent lower end of said body and terminating in a second eye, a snap fastener connected to and carried by said second eye, a swivel carried by said snap fastener, a leader having one end connected with said swivel and its other end provided with a hook for attachment thereto of a bait, a median portion of said leader being adapted to be wound around said neck above said head, a spring clip having an upper end affixed to a peripheral surface of said body and a free lower flexible end deflected outwardly and providing a catch, said catch terminating adjacent said neck and serving to releasably retain that portion of the leader wound around said neck, a second swivel operatively connected to said first eye, and a line having a lower end connected with said second swivel.

2. The fishing device defined in and according to claim 1 and, in combination, a bite signalling tip-up adapted to be operatively mounted atop the ice adjacent a fishing hole in the ice, said tip-up embodying a standard, a tilting beam pivoted intermediate its ends atop the standard, a vertical holddown stake, said stake being flexible and resilient and spaced from and parallel to said standard, one end of said beam terminating adjacent to and being retentively but releasably connectible with said stake and accessible for playing the caught fish, and a coil spring connected to the tip-down end of said beam and also connected with an upper end of said line.

References Cited

UNITED STATES PATENTS

| | | | |
|---|---|---|---|
| 1,819,034 | 8/1931 | Luelloff | 43—17 |
| 2,085,096 | 6/1937 | Hansen | 43—43.13 |
| 2,119,504 | 5/1938 | Lawrence | 43—43.13 X |
| 2,663,962 | 12/1953 | King | 43—17 |
| 2,714,270 | 8/1955 | Premo | 43—17 |
| 2,904,923 | 9/1959 | Conyers | 43—43.11 |
| 2,933,847 | 4/1960 | Frasure | 43—42.33 X |
| 3,056,227 | 10/1962 | Ray | 43—17 |

FOREIGN PATENTS

| | | |
|---|---|---|
| 800,436 | 5/1936 | France. |

SAMUEL KOREN, *Primary Examiner.*

D. J. LEACH, *Assistant Examiner.*